| United States Patent [19] | [11] | 4,250,068 |
|---|---|---|
| Ali-Zaidi | [45] | Feb. 10, 1981 |

[54] COMPOSITION FOR COATING GLASS CONTAINERS

[75] Inventor: Syed R. Ali-Zaidi, Shippenville, Pa.

[73] Assignee: Glass Containers Corporation, Fullerton, Calif.

[21] Appl. No.: 68,541

[22] Filed: Aug. 22, 1979

Related U.S. Application Data

[62] Division of Ser. No. 905,898, May 15, 1978.

[51] Int. Cl.$^3$ ............................................. C08L 91/00
[52] U.S. Cl. ...................... 260/28.5 R; 260/28.5 AV; 260/29.2 EP; 260/29.2 N; 260/29.4 R; 260/29.6 H; 260/29.6 MH; 428/426; 428/430; 428/431
[58] Field of Search ................. 260/28.5 AV, 28.5 R, 260/29.2 EP, 29.2 N, 29.4 R, 29.6 H, 29.6 MH

[56] References Cited

U.S. PATENT DOCUMENTS

| 3,835,078 | 9/1974 | Zdanowski ................. 260/28.5 AV |
| 3,900,438 | 8/1975 | Zdanowski et al. ........ 260/28.5 AV |

*Primary Examiner*—Melvyn I. Marquis
*Attorney, Agent, or Firm*—Parmelee, Miller, Welsh & Kratz

[57] ABSTRACT

A method of coating glass containers and a composition for such coating, wherein a one-step application of the coating is effected, with an aqueous mixture of a polyamino-acrylate ester, a cross-linking agent therefor, a wax, and a vinyl amino silane coupling agent applied to the container at a temperature of between about 200°–400° F. upon exit of the containers from an annealing lehr.

5 Claims, No Drawings

COMPOSITION FOR COATING GLASS CONTAINERS

This is a division, of application Ser. No. 905,898 filed May 15, 1978 pending Group 160.

BACKGROUND OF THE INVENTION

It is customary in the glass manufacturing industry and, in particular, in the manufacture of glass containers to coat the container in order to impart wet and dry scratch and abrasion resistance to the glass surface to decrease breakage during handling, thus increasing the useful life of the container.

The most commonly used protective coating for glass containers consists of a first coating of a tin or titanium oxide which is applied to the container prior to its passing through the annealing lehr followed by a second coating of an organic resin applied to the container after passage through the lehr. This combination of a metal oxide "hot end" coating and an organic resin "cold end" coating imparts both satisfactory abrasion resistance as well as lubricity to the container surface.

This coating system, however, is disadvantageous in that the coating must be applied in two discrete applications, is expensive from the standpoint of cost of starting materials and application, and poses a serious pollution control problem since hydrogen chloride vapors are generated in the application of the tin or titanium coating.

It would be desirable to develop a coating that imparts both scratch resistance and lubricity that can be applied in a single application step and which would eliminate the attendant pollution problems inherent in the dual coating system. Such single step coatings have been developed, one of which is described in U.S. Pat. No. 3,873,352 which, however, has not proven commercially satisfactory in practice.

It is the principal object of this invention to provide a coating composition for application to glass containers which will impart both abrasion resistance and lubricity to the glass surface. It is another object of this invention to provide a coating composition that is applied in one step at the cold or exit end of the annealing lehr. It is a further object of this invention to provide a coating composition that is relatively inexpensive both from the standpoints of cost of starting materials and ease of application.

BRIEF SUMMARY OF THE INVENTION

A coating composition for application to glass containers in a one step application and a method for coating glass containers to improve the abrasion resistance and lubricity thereof whereby there is applied to the glass containers, on their exit from an annealing lehr, a layer of a composition comprising an aqueous mixture of a polyaminoacrylate ester, and a cross-linking agent therefor, a wax, and a vinyl amino silane coupling agent. The composition is applied to the containers upon their exit from the lehr and at a temperature of between 200°–400° F. with an abrasion resistant and lubricious coating formed on the glass containers upon cooling.

DETAILED DESCRIPTION

The present invention comprises a coating composition for application to glass containers, and especially non-returnable bottles, and a method for applying a coating to glass containers in a one step application.

The coating composition comprises an aqueous mixture of basic components and various additives which may enhance certain properties of the coating. The basic components comprise a polyaminoacrylate ester, a cross-linking agent for said ester, a wax, and a vinyl amino silane coupling agent.

The polyaminoacrylate ester which constitutes one component of the coating composition of the invention is an acidified aminoethylated copolymer having pendant aminoalkylate groups of the formula:

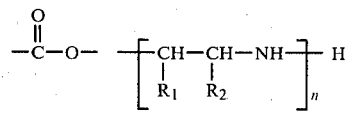

wherein $R_1$ and $R_2$ are independently selected from the group consisting of hydrogen and lower alkyl radicals having 1 to 4 carbon atoms and the average value of n ranges from about 1.0 to 2.5 and wherein the copolymer before aminoethylation contains at least 3 percent by weight pendant —COOH groups. Compounds of this type are described in U.S. Pat. No. 3,719,629, the teachings of which are incorporated by reference herein, and a particularly useful compound of this type is available from the Dow Chemical Company as Experimental Epoxy Curing Agent XD-7080.

A second component of the coating composition comprises a water soluble cross-linking agent for the polyamino acrylate ester which is capable of reaction with and through the carboxyl groups of the polyaminoacrylate ester. Such cross-linking agents are known and comprise urea-formaldehyde condensation products, melamine resins such as melamine formaldehyde condensation products, and hexamethoxymethylmelamine resins, while various epoxy resins, such as a polyglycol diepoxide liquid resin, and the like may also be used.

A wax composition is also added to the mixture, with carnauba wax being preferred, although other waxes compatible with the system could be used.

Another component of the coating composition is a vinyl amino silane coupling agent. The vinyl amino silane coupling agent as used herein can comprise a vinyl amino silane compound wherein both the vinyl group and the amino group are on a particular silane compound or the agent can comprise a mixture of silane compounds, one of which contains a vinyl group and the other of which contains an amino group. When a single silane compound containing both vinyl and amino groups is to be used, an especially useful compound is one of the type described in U.S. Pat. No. 3,734,763, the teachings of which are incorporated herein by reference. A particularly useful compound of that type is N-[beta-(N'paravinylbenzl)-aminoethyl]-gamma-aminopropyl-trimethoxysilane hydrochloride that is commercially available from Dow-Corning Corporation as Z-6032 Silane, having the formula:

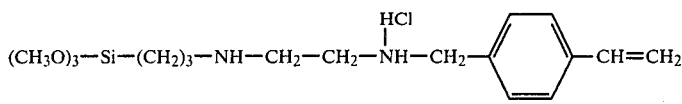

When a mixture of a vinyl group-containing silane and an amino group-containing silane is used, an especially useful vinyl group silane is vinyltriacetoxysilane, commercially available from Dow-Corning as Z-6075 Silane, while an amino group containing silane especially useful in such mixtures comprises γ-aminopropyltriethoxy silane and N-(β-aminoethyl) γ-aminopropyltrimethoxy silane sold by Union Carbide under the designation A-1100 and A-1120, respectively.

The coating composition comprises the aforementioned components as an aqueous solution, which is capable of dilution with water to provide a readily sprayable solution. It is thus preferred to incorporate additional materials to the mixture to solublize the primary components and to minimize separation in diluting aqueous solutions or dispersions. For example, a lower alkylamine, such as methylamine, may be used to solubilize the polyaminoacrylate ester, while a weak organic acid, such as acetic acid, may be used to solubilize the vinyl amino silane coupling agent. The wax may also be solubilized by mixing the same with a gylcol ether. These solubilizing agents are known for use in solubilizing the various components and other such agents may also be used.

Based upon the amount of vinyl amino silane present in the composition, the amount of other components should be such that the composition contains 0.1–0.6 parts wax, 1.5–4 parts polyaminoacrylate ester and 1.5–3 parts of a cross-linking agent therefor, for each part vinyl amino silane present. The amount of vinyl amino silane which should be present in the composition should be an amount which, upon dilution with water to form a sprayable aqueous solution, will give an aqueous solution containing 0.1 to 3 percent by weight thereof.

In the application of the aqueous mixture by spraying, the mixture should be sprayed in an amount so as to form a coating on the glass containers having a thickness of between about 10 to 25 microns. It is also advantageous, after spraying of the glass containers to hold the glass containers at an elevated temperature of between about 150°–250° F. for a short period of time, 2–5 minutes, to enhance the cure of the coating.

The invention is further illustrated by the following examples wherein all parts and percentages are by weight unless otherwise indicated:

EXAMPLE I

About 2 parts of gylcol ether (Dowanol DPM) are added to about 1 part of molten carnauba wax and mixed by stirring. About 9 parts of a urea-formaldehyde cross-linking agent, methylester urea-formaldehyde resin (Beetle 65), is added with stirring to the wax/glycol ether mixture. About 0.5 parts of methylamine are mixed with about 10 parts of polyamino acrylate ester (XD-7080) and this mixture is slowly added with stirring to the wax/glycol ether/urea-formaldehyde mixture. To this latter mixture is added a solution of about 5 parts of a polyaminovinylsilane N-[beta-(N'-paravinylbenzyl)-aminoethyl]-gamma-aminopropyl-trimethoxysilane hydrochloride (Z-6032) in about 5 parts of acetic acid. The resultant formulation (having a pot life of about a week) was diluted 1:16 with water and applied by spraying to glass bottles as the bottles exited from the annealing lehr. The surface temperature of the glass was between 200° to 300° F. and the coating was applied to a thickness of about 25 microns.

After cooling and curing the coated bottles (I) were tested for both wet and dry abrasion resistance and lubricity, and the results compared with test results obtained with a conventional tin oxide-polyethylene coated bottle series (Conventional). The results are listed in Table I.

TABLE I

| | Lubricity Angle of Slide | | Abrasion Resistance-Lbs. | |
| --- | --- | --- | --- | --- |
| | Dry | Wet | Dry | Wet |
| Conventional | 5.3 | 5.6 | 75 | 75 |
| I | 5.3 | 6.3 | 75 | 75 |

The performance of the bottles coated according to Example I was considered as comparable and slightly superior to the conventional coated bottles. Pressure tests to destruction, used in the industry as a test measure of the strength of bottles, were made on bottles that had been passed through a filling line, emptied and tested, with the following results:

| | Pressure to Destruction (psi) |
| --- | --- |
| Conventional | 265 ± 52 |
| I | 274 ± 57 |

This indicates that the bottles coated as in Exmaple I are providing protection to the glass bottles against abrasion comparable or better than the conventional coating.

EXAMPLE II

A series of coating compositions were prepared and applied to glass bottles according to the procedure of Example I, except that the polyaminovinyl silane (Z-6032) was replaced by: (1) a 50-50 mixture of a vinyltriacetroxysilane (Z-6075, Dow-Corning Co.) and a γ-aminopropyltriethoxy silane (A-1100, Union Carbide Co.), to form "Composition B"; (2) a 50-50 mixture of a vinyltriacetoxysilane and a N-(B-aminoethyl)-γ-aminopropyl-trimethoxysilane (A-1120, Union Carbide Co.) to form "Composition C."

A further series of coating compositions were prepared and applied to glass bottles according to the procedure of Example I, except that the polyaminovinyl silane (Z-6032) was replaced by a vinyl silane, vinyltriacetoxysilane (Z-6075) to form "Composition D," or by an aminosilane, N-(2-aminoethyl)3-aminopropyl-trimethoxysilane (Z-6020, Dow-Corning Co.) to form "Composition E."

The coated bottles, having the coatings of Compositions "A" (Example I), "B," "C," "D" and "E" were subjected to a conventional pull test which measured the average pounds per square inch required to separate the coatings from the bottles. The results of the pull tests are listed in Table III:

TABLE III

| Composition | Average Pull Strength (psi) |
|---|---|
| "A" | 2700 ± 400 |
| "B" | 2400 ± 530 |
| "C" | 2000 ± 470 |
| "D" | 1500 ± 540 |
| "E" | 1600 ± 540 |

As can be seen by the pull test results, the compositions which contained an amino vinyl silane or a mixture of an amino silane and a vinyl silane showed significantly improved adhesion to the glass bottles, the marginal values for commercial such coatings being about the 2000 psi level.

I claim:

1. A coating composition for improving the abrasion resistance and lubricity of glass containers, and having good adhesion thereto, comprising an aqueous mixture of a polyaminoacrylate ester, which is an acidified aminoethylated copolymer having pendant aminoalkylate groups of the formula:

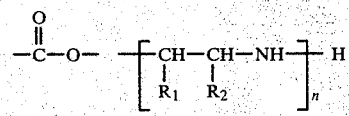

wherein $R_1$ and $R_2$ are independently selected from the group consisting of hydrogen and lower alkyl radicals having 1 to 4 carbon atoms and the average value of n ranges from about 1.0 to 2.5 and wherein the copolymer before aminoethylation contains at least 3 percent by weight pendant —COOH groups; and a crosslinking agent therefore, which crosslinking agent is capable of reaction with and through the carboxyl groups of said polyaminoacrylate ester; a wax and a vinyl amino silane coupling agent.

2. A coating composition for improving the abrasion resistance and lubricity of glass containers as defined in claim 1 wherein said vinyl amino silane coupling agent comprises a silane compound having both vinyl and amino groups thereon.

3. A coating composition for improving the abrasion resistance and lubricity of glass containers as defined in claim 1 wherein said vinyl amino silane coupling agent comprises a mixture of silane compounds, one of which has a vinyl group thereon and the other of which has an amino group thereon.

4. The coating composition for improving the abrasion resistance and lubricity of glass containers as defined in claim 1 wherein said wax comprises carnauba wax.

5. A coating composition for improving the abrasion resistance and lubricity of glass containers as defined in claim 1 wherein said cross-linking agent is selected from the group consisting of urea-formaldehyde condensation product, melamine formaldehyde condensation product or epoxy resin cross-linking agents.

* * * * *